United States Patent [19]

Schuette et al.

[11] Patent Number: 4,639,488

[45] Date of Patent: Jan. 27, 1987

[54] IMPACT-RESISTANT POLYOXYMETHYLENE MOLDING MATERIALS AND THEIR PREPARATION

[75] Inventors: Wilhelm Schuette, Speyer; Graham Edward McKee, Weinheim; Albrecht Hilt, Limburgerhof; Gerhard Heniz, Weisenheim; Heiner Goerrissen, Ludwigshafen, all of Fed. Rep. of Germany

[73] Assignee: BASF Aktiengesellschaft, Fed. Rep. of Germany

[21] Appl. No.: 795,128

[22] Filed: Nov. 5, 1985

[30] Foreign Application Priority Data

Nov. 14, 1984 [DE] Fed. Rep. of Germany ....... 3441547

[51] Int. Cl.$^4$ ............................................. C08L 51/00
[52] U.S. Cl. .................... 524/456; 523/201; 524/504; 525/64; 525/69; 525/902
[58] Field of Search .................. 525/64, 69, 401, 902; 523/201; 524/456, 504

[56] References Cited

U.S. PATENT DOCUMENTS

| | | | |
|---|---|---|---|
| 3,103,499 | 9/1963 | Doles | 528/230 X |
| 3,219,623 | 11/1965 | Berardinelli | 528/230 X |
| 3,476,832 | 11/1969 | Pritchard | 525/154 |
| 3,642,940 | 2/1972 | Burg et al. | 260/837 |
| 3,749,755 | 7/1973 | Bronstert | 525/64 |
| 4,017,558 | 4/1977 | Schmidt et al. | 525/91 |
| 4,296,216 | 10/1981 | Sakano et al. | 525/66 |
| 4,424,307 | 1/1984 | DiEdwardo et al. | 525/154 |

FOREIGN PATENT DOCUMENTS 058331 12/1985 European Pat. Off. .
1017244 1/1966 United Kingdom .

*Primary Examiner*—Theodore E. Pertilla
*Attorney, Agent, or Firm*—Keil & Weinkauf

[57] ABSTRACT

Impact-resistant polyoxymethylene molding materials containing (A) from 30 to 95% by weight of one or more polyoxymethylenes and (B) from 5 to 70% by weight of one or more elastomeric graft polymers which are prepared by emulsion polymerization, are dispersed in component A, have a mean particle diameter of from 0.08 to 2 μm and are composed of 1. from 60 to 90% by weight of a grafting base of crosslinked polybutadiene in which not more than 30% by weight of the butadiene may be replaced with isoprene, 2,3-dimethylbutadiene, styrene, p-methylstyrene, α-methylstyrene and/or (meth)acrylonitrile, and 2. from 10 to 40% by weight of one or more grafted shells consisting of polymers of styrene and/or methyl methacrylate, in which not more than 15% by weight of the said monomers 2 may be replaced with acrylonitrile or a $C_1$–$C_8$-alkyl acrylate, the percentages A and B and the percentages 1 and 2 summing to 100, with or without (C) effective amounts of assistants, and a process for their preparation.

7 Claims, No Drawings

IMPACT-RESISTANT POLYOXYMETHYLENE MOLDING MATERIALS AND THEIR PREPARATION

It is known that the impact strength of polyoxymethylene molding materials can be improved by incorporating elastomeric polymers. German Laid-Open Application DOS No. 1,964,156 describes a mixture of a polyoxymethylene with a graft rubber, the grafting base consisting of an alkyl acrylate/butadiene polymer and the grafted shell being composed of further monomers. Such molding materials have an unsatisfactory impact strength, particularly at low temperatures, and possess insufficient thermal stability. Mixtures of polyoxymethylenes and polyurethanes as described in German Pat. No. 1,193,240 also do not possess an adequate low-temperature impact strength. Such molding materials have the further disadvantage that they yellow in light and the polyurethanes decompose at fairly high processing temperatures. In accordance with Belgian Pat. No. 703,215, attempts have been made to improve the impact strength of polyoxymethylene by adding a butadiene/acrylonitrile rubber which is preferably non-crosslinked. Such molding materials, too, have an inadequate impact strength at low temperatures; moreover, fairly large amounts of the rubber are incompatible with polyoxymethylene. The addition of polybutadiene of low crystallinity to polyoxymethylene, as disclosed in U.S. Pat. No. 4,424,037, or the addition of block copolymers of butadiene and a polyalkylene oxide, as disclosed in German Laid-Open Application DOS No. 2,408,487, also do not result in adequate impact strength at low temperatures.

It is an object of the present invention to provide impact-resistant polyoxymethylene molding materials which have high impact strength at low temperatures, in particular down to $-40°$ C., possess good thermal stability and, finally, show little tendency to discoloration in the presence of light.

We have found that this object is achieved by impact-resistant polyoxymethylene molding materials which contain butadiene-containing elastomeric graft polymers, the said molding materials containing (A) from 30 to 95% by weight of one or more polyoxymethylenes and (B) from 5 to 70% by weight of one or more elastomeric graft polymers which are prepared by emulsion polymerization, are dispersed in component A, have a mean particle diameter of from 0.08 to 2 $\mu$m and are composed of 1. from 60 to 90% by weight of a grafting base of crosslinked polybutadiene in which not more than 30% by weight of the butadiene may be replaced with isoprene, 2,3-dimethylbutadiene, styrene, p-methylstyrene, α-methylstyrene and/or (meth)acrylonitrile, and 2. from 10 to 40% by weight of one or more grafted shells consisting of polymers of styrene and/or methyl methacrylate, in which not more than 30% by weight of the said monomers 2 may be replaced with acrylonitrile or a $C_1$–$C_8$-alkyl acrylate, the percentages A+B and 1+2 each summing to 100, with or without (C) effective amounts of assistants.

The novel polyoxymethylene molding materials possess a high impact strength at low temperatures, in particular down to $-40°$ C., and furthermore exhibit good thermal stability and show little tendency to become discolored in the presence of light.

Suitable polyoxymethylenes (component A) are homopolymers of formaldehyde or copolymers of formaldehyde or of trioxane or tetroxane with cyclic and/or linear formals, e.g. 1,3-dioxolane, butanediol formal or epoxides such as ethylene oxide or propylene oxide. As a rule, the homopolymers have thermally stable terminal groups, such as ester or ether groups. The copolymers of formaldehyde, of trioxane or of tetroxane advantageously contain more than 50%, in particular more than 75%, of oxymethylene groups. Particularly useful copolymers are those in which not less than 0.1% of the comonomer groups possess two or more neighboring carbon atoms in the chain. The polyoxymethylenes which contain from 0.5 to 10%, in particular from 1 to 5%, of comonomers have become particularly important industrially. Such copolymers are obtainable in a conventional manner by cationic copolymerization or trioxane with suitable comonomers, such as cyclic ethers of acetals, e.g. ethylene oxide, 1,3-dioxolane, 1,3-dioxane, 1,3-dioxacycloheptane or 1,3,6-trioxacyclooctane, or with linear oligoformals or polyformals, such as polydioxolane or polybutanediolformal. As a rule, the polyoxymethylenes used have a number average molecular weight of from 10,000 to 100,000.

Compounds containing a plurality of polymerizable groups in the molecule, e.g. alkylglycidyl formals, polyglycol diglycidyl ethers, alkanediol diglycidyl ethers or bis-(alkanetriol)-triformals, can, if required, be used as additional comonomers for trioxane, the amount of these comonomers being from 0.05 to 5, preferably from 0.1 to 2% by weight, based on the total amount of monomers.

The novel molding materials contain component A in an amount of from 30 to 95, in particular from 40 to 85, % by weight.

The molding materials according to the invention contain, as component B, from 5 to 70, in particular from 15 to 60, % by weight of one or more crosslinked elastomeric graft polymers which are prepared by emulsion polymerization, are dispersed in component A and have a mean particle diameter of from 0.08 to 2 $\mu$m.

These graft polymers are composed of 1. from 60 to 90% by weight of a grafting base consisting of crosslinked polybutadiene, of which not more than 30% by weight, based on 1, may be replaced with isoprene, 2,3-dimethylbutadiene, styrene, p-methylstyrene, α-methylstyrene and/or (meth)acrylonitrile as comonomers. Advantageously, the grafting base has a gel content greater than 50%, in particular greater than 60%, and a glass transition temperature $\neq -40°$ C. The grafting base is obtained, for example, by emulsion polymerization of butadiene with or without comonomers, using a free radical initiator and, if required, a molecular weight regulator, such as a mercaptan, e.g. tert.-dodecyl mercaptan. Crosslinked polybutadiene is preferably used as the grafting base.

The graft polymer contains 2. from 10 to 40% by weight of one or more grafted shells of polymers of styrene and/or methyl methacrylate, in which not more than 30% by weight of the stated monomers 2 may be replaced with acrylonitrile or a $C_1$–$C_8$-alkyl acrylate.

Of course, the percentages under 1. and 2. sum to 100.

Such graft polymers are known per se and are prepared by conventional procedures, as disclosed in Houben-Weyl, Methoden der organischen Chemie, volume XIV/1, 1961, pages 133–560.

Preferred graft polymers are composed of from 70 to 85% by weight of crosslinked polybutadiene having a gel content greater than 70%, as a grafting base, and from 15 to 30% by weight of a grafted shell of methyl methacrylate, of which not more than 20% by weight may be replaced with a $C_1$-$C_4$-alkyl acrylate, in particular methyl acrylate, ethyl acrylate or n-butyl acrylate.

The graft rubber dispersions have a mean particle diameter of from 0.08 to 2 $\mu$m, in particular from 0.08 to 0.5 $\mu$m (determined by counting under the electron microscope or by ultracentrifuging). The dispersions contain, as a rule, from 30 to 80, preferably from 40 to 65, % by weight of water. The sum of the percentages of components A and B is in each case 100.

In addition, the novel molding materials can contain, as a further component C, any additives as conventionally used for thermoplastic polyoxymethylenes. Examples of such additives are dyes or pigments, antistatic agents, antioxidants, stabilizers, nucleation agents, optical brighteners, mold release agents, flame-proofing agents and lubricants. Other additives are reinforcing fillers, such as glass fibers, glass spheres, talc, chalk, wollastonite, polytetrafluoroethylene, carbon black or graphite. Such fillers are used in amounts of, for example, from 10 to 100%, in particular from 10 to 70%, based on the sum of components A and B. Particularly suitable reinforcing agents are wollastonite, glass fibers and glass spheres.

It has also proven useful to add, in particular, from 0.1 to 3% by weight of an alkoxymethylmelamine. Such alkoxymethylmelamines are described in, for example, German Laid-Open Application DOS No. 2,921,167. Moreover, it is often desirable to add other additives which improve the impact strength, for example thermoplastic polyurethanes as disclosed in German Pat. No. 1,193,240, in amounts of from 10 to 50%, based on the sum of components A and B.

The thermoplastic molding materials according to the invention are prepared, as a rule, by plastifying and mixing rubber, after it has been precipitated from the dispersion and dried, with the thermoplastic polymer A, in the presence or absence of other assistants C, in an extruder. In an advantageous procedure, the thermoplastic polymer A is first plastified in an extruder, for example at from 170° to 260° C., in particular from 180° to 240° C. Where a polyoxymethylene copolymer which still contains unstable constituents after its preparation is used as component A, the said copolymer can be subjected beforehand to partial hydrolytic or thermal degradation down to primary terminal alcohol groups in order to remove these unstable constituents (cf. U.S. Pat. Nos. 3,103,499 and 3,219,623). However, the undegraded crude polymer may also be used. In the latter case, thermal degradation of the polyoxymethylene down to stable chain ends takes place simultaneously with the mixing in of the graft rubber B and, where relevant, the other substances C in the extruder. The resulting volatile constituents are advantageously removed via one or more devolatilization orifices located on the extruder.

In another, preferred method of incorporating the graft rubber into the polyoxymethylene A, the thermoplastic polymer A is first melted, in the presence or absence of other substances C. The rubber dispersion B is then metered directly, ie. without precipitating the rubber beforehand, into the polymer melt. During this procedure, the water evaporates spontaneously and the rubber particles become dispersed in the melt. In an advantageous procedure, the polyoxymethylene A is first plastified in an extruder, after which the rubber dispersion is added via a feed orifice arranged along the extruder and is mixed thoroughly with the polymer melt, and the volatile constituents are removed via one or more devolatilization orifices. In this case too, it is particularly advantageous to use a crude polyoxymethylene polymer as component A, since the thermal degradation of the polyoxymethylene down to stable chain ends then takes place simultaneously with mixing in of the rubber. The volatile products formed during this degradation are taken off together with the water via devolatilization orifices in the extruder.

When the rubber dispersion has been mixed into the polyoxymethylene melt, the processing temperature being within the usual range for thermoplastic polymers, ie. about 170°–260° C., the melt is extruded, and the extrudates are cooled and comminuted.

The novel molding materials are useful for the production of moldings by injection molding or extrusion.

The Examples which follow illustrate the invention. Below, $W_{50}$ denotes 50% breaking energy for 2 mm thick circular disks, measured according to DIN 53,443, and $V_L$ denotes weight loss of a sample after heating for 2 hours at 222° C. in the air.

Gel content: A sample of the grafting base is dried for 24 hours at 70° C. under 250 mbar, after which it is mixed with tetrahydrofuran to give a 1% strength mixture, and the latter is shaken for 24 hours at 23° C. The resulting gel is centrifuged under 40,000 g and then dried for 24 hours at 70° C. under 250 mbar.

Gel content=weight of the gel after drying/weight of the grafting base after drying.

EXAMPLES

Grafting bases used

G1 Polymer of 100 parts of butadiene and 1 part of tert.-dodecylmercaptan as a regulator, prepared by emulsion polymerization in the presence of 1% by weight of potassium stearate as an emulsifier. Gel content: 71% by weight; solids content: 39% by weight.

G2 Emulsion polymer of butadiene, prepared as described under G1, but having a gel content of 84% and a solids content of 48%.

G3 Polymer of 90 parts by weight of butadiene, 10 parts by weight of styrene and 1 part by weight of tert.-dodecyl mercaptan as a regulator, prepared by emulsion polymerization in the presence of 1% by weight of potassium oleate as emulsifier. Gel content=65% by weight, solids content=42% by weight.

G4 Polymer of 98 parts of n-butyl acrylate and 2 parts of dicyclopentadienyl acrylate, prepared by emulsion polymerization in the presence of 0.6% by weight of sodium hexadecyl sulfonate as an emulsifier. Solids content: 43% by weight.

G5 Polymer of 60 parts by weight of n-butyl acrylate and 40 parts by weight of butadiene, prepared by emulsion polymerization in the presence of 1.2% by weight of sodium hexadecyl sulfonate as an emulsifier. Solids content=39% by weight.

Graft rubbers

P1 20 parts by weight of methyl methacrylate were grafted onto 80 parts by weight (based on solid) of the grafting base G1. The dispersion had a solids content of 41% by weight and a mean particle diameter of 0.1 μm.

P2 20 parts by weight of a mixture of styrene and acrylonitrile in a weight ratio of 3:1 were grafted onto 80 parts by weight (based on solid) of the grafting base G1. The dispersion had a solids content of 40% and a mean particle diameter of 0.1 μm.

P3 20 parts by weight of a mixture of styrene and acrylonitrile in a weight ratio of 3:1, followed by 20 parts of methyl methacrylate, were grafted onto 60 parts by weight (based on solid) of the grafting base G2. The dispersion had a solids content of 47% and a mean particle diameter of 0.15 μm.

P4 90 parts by weight (based on solid) of the grafting base G1 were agglomerated with 4% by weight (based on solid) of an ethyl acrylate/methacrylamide copolymer dispersion according to German Published Application DAS No. 2,427,960. 10 parts by weight of methyl methacrylate were then grafted onto the agglomerated grafting base. The dispersion had a solids content of 38% by weight and a mean particle diameter of 0.28 μm.

P5 10 parts by weight of styrene, followed by 20 parts by weight of methyl methacrylate, were grafted onto 70 parts by weight (based on solid) of the grafting base G3. The dispersion had a solids content of 45% by weight and a mean particle diameter of 0.12 μm.

P6 30 parts by weight of a mixture of methyl methacrylate and n-butyl acrylate in a weight ratio of 9:1 were grafted onto 70 parts by weight (based on solid) of the grafting base G2. The dispersion had a solids content of 49% by weight and the mean particle diameter was 0.09 μm.

P7 20 parts by weight of methyl methacrylate were grafted onto 80 parts by weight (based on solid) of the grafting base G4. The dispersion had a solids content of 44% by weight and a mean particle diameter of 0.45 μm.

P8 25 parts by weight of a mixture of styrene and acrylonitrile in a weight ratio of 3:1 were grafted onto 75 parts by weight (based on solid) of the grafting base G5. The dispersion had a solids content of 41% by weight and a mean particle diameter of 0.1 μm.

Polyoxymethylene

Copolymer of trioxane and about 2.5% by weight of 1,3-dioxepan, prepared by cationic polymerization. Melt flow index MFI 190/2.16: about 0.9 g/min, density: 1.41 g/cm$^3$.

EXAMPLE 1

80 parts by weight of polyoxymethylene were plastified in a twin-screw extruder at 200° C., and 20 parts by weight (based on solid) of the graft rubber dispersion P1 were metered in in a downstream zone and mixed thoroughly with the molten polyoxymethylene. The resulting steam and other volatile constituents were removed in the two downstream devolatilization zones. The melt was extruded, and the extrudates were cooled and comminuted. The molding material obtained had a breaking energy $W_{50}$ of 45 Joule at 23° C., 33 Joule at −40° C. and 19 Joule at −60° C. and a weight loss $V_L$ of 7.6%. The granules were white.

Unmodified polyoxymethylene has a breaking energy $W_{50}$ of 2 Joule at 23° C., 1 Joule at −40° C. and less than 1 Joule at −60° C.

EXAMPLE 2

Graft rubber P1 was precipitated with acetone (1 part by weight of acetone per part by weight of dispersion), the precipitate was filtered off and the coagulate was dried for 48 hours at 50° C. under 100 mbar. 20 parts by weight of the dry rubber together with 80 parts by weight of polyoxymethylene were introduced into the feed zone of a type ZSK 28 twin-screw extruder and extruded at 200° C. The resulting molding material had a breaking energy $W_{50}$ of 34 Joule at 23° C., 22 Joule at −40° C. and 10 Joule at −60° C. and a weight loss $V_L$ of 8.5%. The granules were white.

EXAMPLE 3

The procedure described in Example 1 was followed, except that 20 parts by weight (based on the solids content) of the dispersion P2 were used instead of dispersion P1. The resulting molding material had a breaking energy $W_{50}$ of 37 Joule at 23° C. and 25 Joule at −40° C. and a weight loss $V_L$ of 7.9%. The granules were yellowish.

EXAMPLE 4

The procedure described in Example 1 was followed, except that 20 parts by weight (based on the solids content) of the dispersion P3 were used instead of dispersion P1. The resulting molding material had a breaking energy $W_{50}$ of 25 Joule at 23° C. and 14 Joule at −40° C. and a weight loss $V_L$ of 7.5%. The granules were white.

EXAMPLE 5

The procedure described in Example 1 was followed, except that 20 parts by weight (based on the solids content) of dispersion P4 were used instead of dispersion P1. The resulting molding material had a breaking energy $W_{50}$ of 38 Joule at 23° C. and 27 Joule at −40° C. The granules obtained were white and had a weight loss $V_L$ of 7.6%.

EXAMPLE 6

The procedure described in Example 2 was followed, except that the precipitated graft rubber of dispersion P5 was used. The molding material had a breaking energy $W_{50}$ of 25 Joule at 23° C., 10 Joule at −40° C. and 5 Joule at −60° C. and a weight loss $V_L$ of 7.4%.

EXAMPLE 7

Using a procedure similar to that described in Example 1, 60 parts of polyoxymethylene were mixed with 36 parts (based on the solids content) of dispersion P5, and the mixture was granulated. The resulting molding material had a breaking energy $W_{50}$ of greater than 120 Joule at 23° C., 90 Joule at −40° C. and 41 Joule at −60° C., the granules were white and the weight loss $V_L$ was 6.4%.

EXAMPLE 8

60 parts of polyoxymethylene together with 18 parts of a polyurethane produced from 4,4'-diphenylmethane diisocyanate, adipic acid and butane-1,4-diol were fed into a twin-screw extruder and plastified at 200° C. 18 parts (based on the solids content) of dispersion P1 were metered into a downstream zone and mixed thoroughly there with the melt. The resulting steam was removed in two downstream devolatilization zones. The melt was extruded and the extrudates were cooled and comminuted. The resulting molding material had a breaking energy $W_{50}$ of greater than 120 Joule at 23° C., 64 Joule at −40° C. and 18 Joule at −60° C.

EXAMPLE 9

50 parts of polyoxymethylene, 30 parts of wollastonite and 1 part of tetramethoxymethylmelamine were introduced into the feed zone of a twin-screw extruder and plastified at 200° C. 20 parts (based on the solids content) of dispersion P4 were metered into a downstream zone and mixed thoroughly there with the melt. The resulting steam was removed in two downstream devolatilization zones. The melt was then extruded and the extrudates were cooled and comminuted. The molding material obtained had a breaking energy $W_{50}$ of 11 Joule at 23° C., 8 Joule at −40° C. and 4 Joule at −60° C.

EXAMPLE 10

60 parts of polyoxymethylene and 1 part by weight of tetramethoxymethylmelamine were fed into the feed zone of a twin-screw extruder and plastified at 200° C. 30 parts by weight (based on the solids content) of dispersion P5 were metered into a downstream zone and mixed thoroughly there with the melt. The resulting steam was removed in two downstream devolatilization zones. In a downstream zone of the extruder, 10 parts by weight of glass fibers (rovings having a filament diameter of about 10 μm) were then introduced into the melt and finely dispersed therein. The resulting molding material had a breaking energy $W_{50}$ of 23 Joule at 23° C., 17 Joule at −40° C. and 9 Joule at −60° C.

COMPARATIVE EXAMPLE 1

The procedure described in Example 1 was followed, except that 20 parts by weight (based on the solids content) of dispersion P7 were used instead of dispersion P1. The molding material obtained had a breaking energy $W_{50}$ of 28 Joule at 23° C., 5 Joule at −40° C. and 1 Joule at −60° C. and a weight loss $V_L$ of 28.5%.

COMPARATIVE EXAMPLE 2

The procedure described in Example 1 was followed, except that 20 parts by weight (based on the solids content) of dispersion P8 were used. The resulting molding material had a breaking energy $W_{50}$ of 25 Joule at 23° C., 6 Joule at −40° C. and 2 Joule at −60° C. and a weight loss $V_L$ of 22.7%.

COMPARATIVE EXAMPLE 3

80 parts by weight of polyoxymethylene and 20 parts by weight of a polyurethane produced from 4,4′-diphenylmethane diisocyanate, adipic acid and butane-1,4-diol were melted at 200° C. in a twin-screw extruder and mixed thoroughly therein, after which the mixture was extruded and the extrudates were cooled and comminuted. The molding material thus obtained had a breaking energy $W_{50}$ of 33 Joule at 23° C., and 4 Joule at −40° C. The molding material exhibited substantial yellowing when stored in daylight for a period of 3 weeks and developed a brownish discoloration at a processing temperature above 215° C.

The molding materials according to the invention do not show any marked yellowing after storage in daylight for 3 weeks, nor do they develop any brown coloration at processing temperatures above 215° C.

We claim:

1. An impact-resistant polyoxymethylene molding material containing
   (A) from 30 to 95% by weight of one or more polyoxymethylenes and
   (B) from 5 to 70% by weight of one or more elastomeric graft polymers which are prepared by emulsion polymerization, are dispersed in component A, have a mean particle diameter of from 0.08 to 2 μm and are composed of
      1. from 60 to 90% by weight of a grafting base of crosslinked polybutadiene in which not more than 30% by weight of the butadiene may be replaced by one or more of isoprene, 2,3-dimethylbutadiene, styrene, p-methylstyrene, α-methylstyrene and (meth)acrylonitrile, and
      2. from 10 to 40% by weight of one or more grafted shells consisting of polymers of styrene, methyl methacrylate or mixtures thereof which not more than 30% by weight of the said monomers 2 may be replaced with acrylonitrile or a $C_1$–$C_8$-alkyl acrylate,
   the percentages A and B and the percentages 1 and 2 summing to 100, 2. An impact-resistant molding material as defined in claim 1, wherein the graft polymer has a gel content greater than 50%.

3. An impact-resistant molding material as defined in claim 1, containing from 10 to 100% by weight, based on the sum of components A and B, of reinforcing fillers.

4. An impact-resistant molding material as defined in claim 1, wherein the graft polymer has a particle size of from 0.08 to 0.5μm.

5. An impact-resistant molding material as defined in claim 1, wherein the graft polymer (component B) is composed of from 70 to 85% by weight of a grafting base of crosslinked polybutadiene and from 15 to 30% by weight of a grafted shell consisting of methyl methacrylate, of which not more than 20% by weight may be replaced with a $C_1$–$C_4$-alkyl acrylate.

6. A process for the preparation of a polyoxymethylene molding material as defined in claim 1, wherein a melt of the crude polyoxymethylene A is mixed thoroughly with an aqueous dispersion of the elastomeric graft polymer B, and at the same time the vaporized water and the degradation products of the crude polyoxymethylene are removed.

7. A molding material as defined in claim 3, wherein the fillers are selected from wollastonite, glass fibers and glass spheres.

* * * * *

UNITED STATES PATENT AND TRADEMARK OFFICE
CERTIFICATE OF CORRECTION

PATENT NO. : 4,639,488
DATED : January 27, 1987
INVENTOR(S) : Wilhelm Schuette et al It is certified that error appears in the above-identified patent and that said Letters Patent is hereby corrected as shown below:

On the title page, inventors:
"Edward" should read -- Edmund --.

In the abstract, line 15, "and-" should read -- and --.

Column 8, line 31, "100," should read -- 100. --.

Signed and Sealed this

First Day of September, 1987

Attest:

DONALD J. QUIGG

Attesting Officer

Commissioner of Patents and Trademarks